US010726261B2

(12) United States Patent
Lee et al.

(10) Patent No.: US 10,726,261 B2
(45) Date of Patent: Jul. 28, 2020

(54) METHOD AND APPARATUS TO RECOGNIZE USER

(71) Applicant: SAMSUNG ELECTRONICS CO., LTD., Suwon-si (KR)

(72) Inventors: Hyunjeong Lee, Hwaseong-si (KR); Sungjoo Suh, Seoul (KR); Changyong Son, Anyang-si (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 15/791,846

(22) Filed: Oct. 24, 2017

(65) Prior Publication Data

US 2018/0165517 A1      Jun. 14, 2018

(30) Foreign Application Priority Data

Dec. 13, 2016   (KR) .................. 10-2016-0169715

(51) Int. Cl.
*G06K 9/00* (2006.01)
*G06K 9/03* (2006.01)

(52) U.S. Cl.
CPC ....... *G06K 9/00617* (2013.01); *G06K 9/0061* (2013.01); *G06K 9/00604* (2013.01); *G06K 9/036* (2013.01)

(58) Field of Classification Search
CPC ................. G06K 9/00617; G06K 9/00604
See application file for complete search history.

(56) References Cited

U.S. PATENT DOCUMENTS

| | | | |
|---|---|---|---|
| 7,697,735 B2 | 4/2010 | Adam et al. | |
| 7,747,044 B2 | 6/2010 | Baker et al. | |
| 8,457,367 B1 | 6/2013 | Sipe et al. | |
| 9,064,145 B2 | 6/2015 | Tan et al. | |
| 2012/0314911 A1* | 12/2012 | Paul | G06F 21/32 382/115 |
| 2016/0364609 A1* | 12/2016 | Ivanisov | G06K 9/00604 |

FOREIGN PATENT DOCUMENTS

| KR | 10-0443674 B1 | 8/2004 |
|---|---|---|
| KR | 10-0982197 B1 | 9/2010 |
| KR | 10-1030652 B1 | 4/2011 |
| KR | 10-1202448 B1 | 11/2012 |
| KR | 10-1276345 B1 | 6/2013 |
| KR | 10-2016-0036359 A | 4/2016 |

* cited by examiner

*Primary Examiner* — Tuan H Nguyen
(74) *Attorney, Agent, or Firm* — NSIP Law

(57) ABSTRACT

Disclosed is a user recognition apparatus and method, the apparatus configured to determine a validity of an iris area for each frame, to perform an iris recognition when the iris area is valid, and to extract a facial feature for a fusion recognition when the iris area is invalid.

19 Claims, 9 Drawing Sheets

METHOD AND APPARATUS TO RECOGNIZE USER

CROSS-REFERENCE TO RELATED APPLICATION(S)

This application claims the benefit under 35 USC § 119(a) of Korean Patent Application No. 10-2016-0169715 filed on Dec. 13, 2016, in the Korean Intellectual Property Office, the entire disclosure of which is incorporated herein by reference for all purposes.

BACKGROUND

1. Field

The following description relates to technology for recognizing a user.

2. Description of Related Art

With developments in various mobile devices such as a smartphone and wearable devices, the importance of secured authentication has increased. In biometrics authentication technology, a user may be authenticated based on a biological feature, such as, for example, a DNA fingerprint, a fingerprint, an iris, voice, a face, and a blood vessel. The biometrics authentication technology may use a unique biometric property of each user. The biometric property is robust against forgery or falsification, does not cause any inconvenience in carrying the authentication code, and change very little over a lifetime.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method to recognize a user including extracting facial feature data corresponding to a portion of a face from a frame image, in response to quality information of an iris area extracted from the frame image being invalid, and performing an iris recognition based on the iris area, in response to the quality information being valid.

The performing of the iris recognition may include determining availability of facial feature data extracted from a previous frame image, in response to the iris area not matching registered iris information, and performing a user recognition based on the iris area and the facial feature data, in response to facial feature data extracted from the previous frame image being available.

The performing of the iris recognition may include waiting for a subsequent frame image is to be acquired, in response to facial feature data extracted from the previous frame image not being available.

The performing of the user recognition may include determining that an object included in the current frame image matches a registered user, in response to an iris score being greater than a first threshold score set for a registered iris of the registered user, the iris score being calculated based on the iris area, and a facial feature score being greater than a second threshold score set for a registered facial feature of the registered user, the facial feature score calculated based on the facial feature data.

The performing of the user recognition may include determining that an object included in the current frame image matches a registered user in response to a combined score being greater than a combined threshold score, the combined score being calculated based on the iris area and the facial feature data.

The determining that the object matches the registered user may include calculating the combined score by applying an iris weight to an iris score based on the iris area and applying a feature weight to a facial feature score based on the facial feature data.

The performing of the iris recognition may include recognizing the face as a face of a registered user corresponding to registered iris information, in response to the iris area matching the registered iris information.

The performing of the iris recognition may include performing a user recognition based on the iris area and cumulative facial feature data up to facial feature data of a frame previous to the frame, in response to the iris area not matching registered iris information.

The extracting of the facial feature data may include accumulating facial feature data of different parts, and storing the accumulated facial feature data.

The extracting of the facial feature data may include extracting, from the frame image, facial feature data of a part different from a part of which facial feature data is extracted from a previous frame.

The extracting of the facial feature data may include determining a target part from the frame image based on an extraction order; and extracting the facial feature data of the target part.

The extracting of the facial feature data may include selecting a facial area corresponding to a landmark set from a plurality of facial areas; and extracting facial feature data of a part corresponding to the selected facial area.

The extracting of the facial feature data may include selecting a facial area corresponding to an area having highest quality information, in response to an overall face area or portions of the overall face area being identified from the frame image; and extracting facial feature data of a part corresponding to the selected facial area.

The method may include extracting the facial feature data from a subsequent frame and performing the iris recognition, in response to the quality information of the iris area extracted from the frame image being less than a minimum threshold.

The extracting of the facial feature data may include extracting the facial feature data, in response to the quality information of the iris area extracted from the frame image being greater than or equal to a minimum threshold and less than a valid threshold.

The may include terminating the user recognition in response to a frame image matching a registered user being absent, in response to a number of frames are processed.

The method may include calculating the quality information of the iris area based on any one or any combination of an exposure amount of the iris area and a shake amount of the iris area; and determining whether the quality information of the iris area is valid.

The method may include projecting an infrared light to an object and acquiring the frame image based on an infrared light reflected from the object.

In another general aspect, there is provided an apparatus to recognize a user including an image acquirer configured to acquire frame images, and a processor configured to extract facial feature data corresponding to a portion of a face from a frame image among the plurality of frame images, in response to quality information of an iris area extracted from the frame image being invalid, and to perform an iris recognition based on the iris area, in response to the quality information being valid.

Other features and aspects will be apparent from the following detailed description, the drawings, and the claims.

Figure 1:
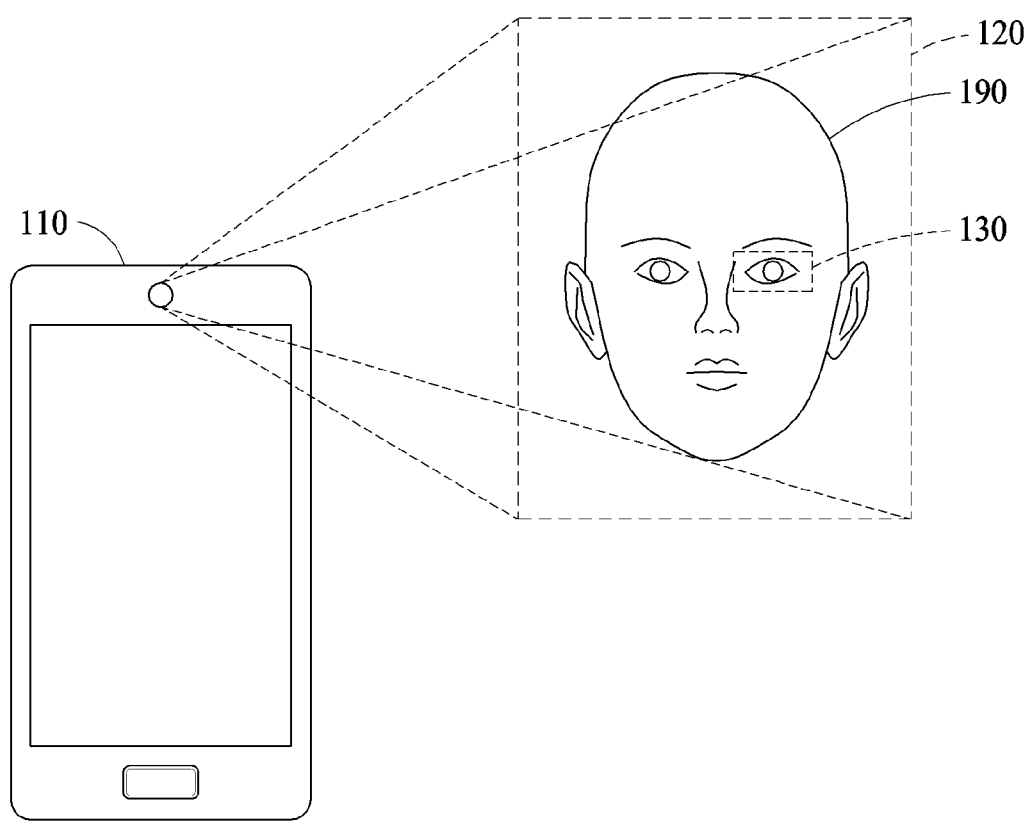
FIG. 1 illustrates an example of a user recognition.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only, and is not to be used to limit the disclosure. As used herein, the terms "a," "an," and "the" are intended to include the plural forms as well, unless the context clearly indicates otherwise.

FIG. 1 illustrates an example of a user recognition.

A user recognition apparatus 110 recognizes an object 190 based on various features representing the object 190.

In an example, the user recognition apparatus 110 acquires an input image including the object 190 by capturing an external area 120 of the user recognition apparatus 110. The input image may include a plurality of frame images and in an example, the input image is an infrared intensity image representing an intensity to which an infrared light projected to the object 190 is reflected. The user recognition apparatus 110 projects an infrared light to the object 190 and acquires a current frame image based on an infrared light reflected from the object 190.

When the object 190 is a person, the user recognition apparatus 110 extracts a feature associated with an iris of the person and a feature associated with a face of the person from the input image. The user recognition apparatus 110 recognizes the object 190 in the input image by integrally using the feature associated with the iris and the feature associated with the face. The user recognition apparatus 110 extracts an area 130 of an eye and performs iris recognition.

Although the present disclosure describes the object 190 as a person, embodiments are not limited thereto. Depending on examples, the object 190 may be an animal and features associated with a head of an animal and an iris of the animal may also be integrally used.

To perform the user recognition by integrally using information on a face and information on an iris, the user recognition apparatus 110 efficiently schedules a facial recognition task and an iris recognition task. The user recognition apparatus 110 selects an appropriate recognition scheme based on a status of an input frame image, thereby performing the recognition with increased speed and accuracy.

In an example, the user recognition apparatus 110 is applied to, for example, an intelligent agent, a mobile phone, a cellular phone, a smartphone, a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a television (TV), a high definition television (HDTV), an optical disc player, a DVD player, a Blue-ray player, a setup box, robot cleaners, a home appliance, a smart appliance, content players, communication systems, image processing systems, graphics processing systems, various other Internet of Things (IoT) devices that are controlled through a network, or any other device capable of wireless communication or network communication consistent with that disclosed herein.

The user recognition apparatus 110 may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses. The user recognition apparatus 110 may be applied to, for example, perform an iris-based user recognition in the smartphone and a mobile device, perform iris-based payment and banking in the smartphone and the mobile device, and perform a user recognition in a smart door, the TV, and a smart home.

Figure 2:
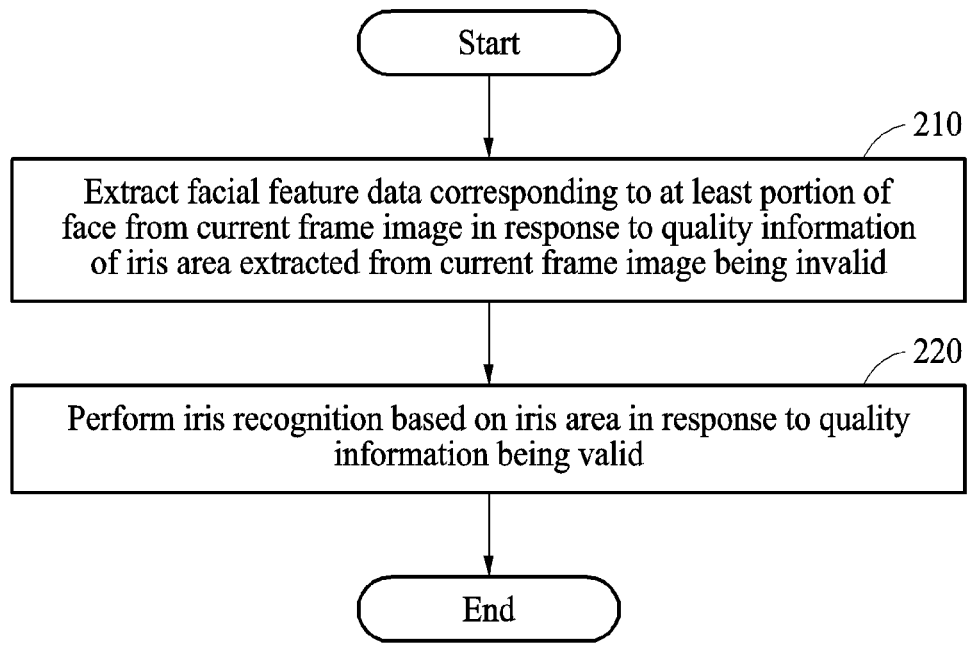
FIGS. 2 through 4 illustrate examples of a user recognition method.
Figure 3:
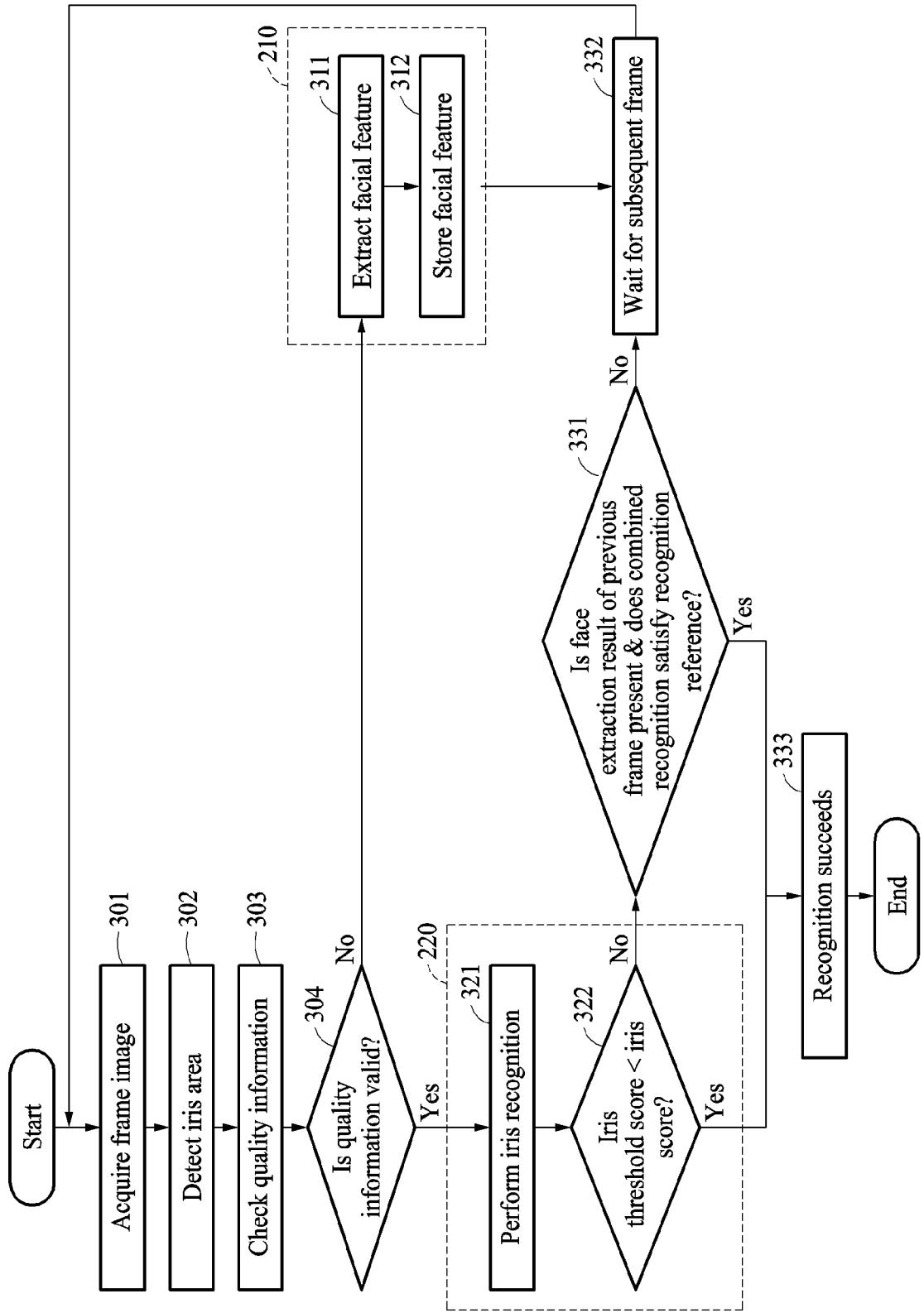
Figure 4:
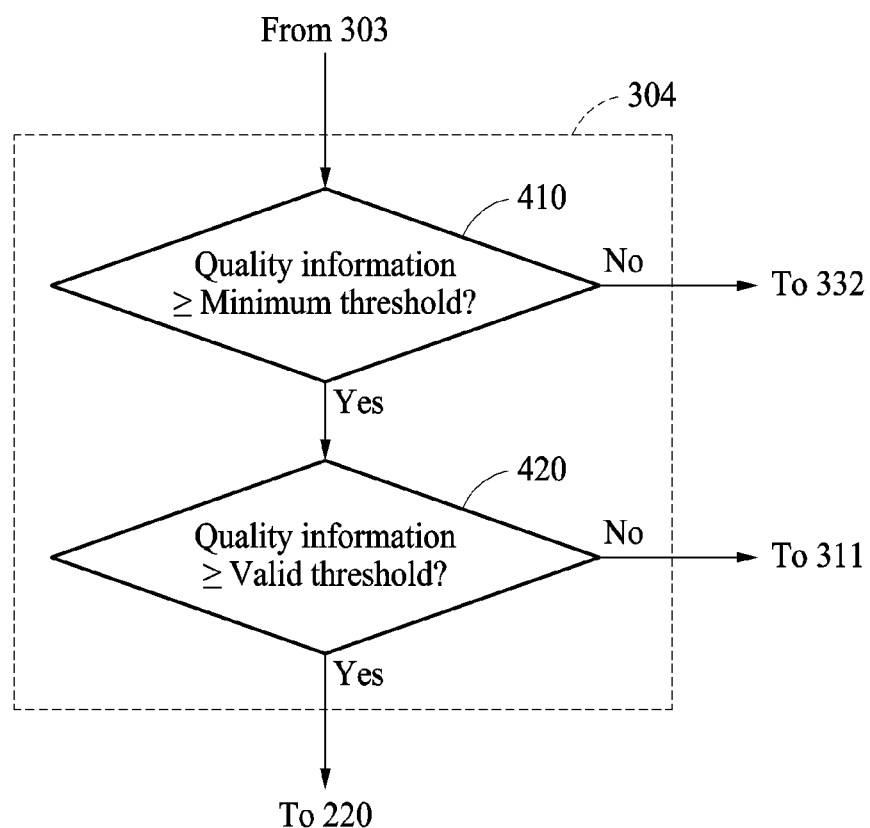

FIGS. 2 through 4 illustrate examples of a user recognition method. The operations in FIGS. 2-4 may be performed in the sequence and manner as shown, although the order of some operations may be changed or some of the operations omitted without departing from the spirit and scope of the illustrative examples described. Many of the operations shown in FIGS. 2-4 may be performed in parallel or concurrently. One or more blocks of FIGS. 2-4, and combinations of the blocks, can be implemented by special purpose hardware-based computer that perform the specified functions, or combinations of special purpose hardware and computer instructions. In addition to the description of FIGS. 2-4 below, the descriptions of FIG. 1 is also applicable to FIGS. 2-4, and are incorporated herein by reference. Thus, the above description may not be repeated here.

A user recognition apparatus acquires consecutive frame images as input images including an object. In an example, the user recognition apparatus determines whether to extract facial feature data of a face or to perform an iris recognition for each of the frame images while acquiring the frame images.

Referring to FIG. 2, when a current frame image is loaded, the user recognition apparatus extracts facial feature data corresponding to a face or performs the iris recognition based on whether quality information of the current frame image is valid.

Hereinafter, feature data may indicate abstracted information of a feature of an object, such as, for example, a feature of a face of a person, a feature of each part of the face, and a feature of an iris of the person. The quality information may be information indicating a quality of a whole image or quality of a portion of the whole image and include, for example, an exposure amount of image, a shake amount of image, a degree of blur in an image, and an image quality. In an example, the shake amount of image is calculated based on, for example, the degree of blur in an image.

In operation 210, the user recognition apparatus extracts facial feature data corresponding to at least a portion of a face from a current frame image and stores the extracted facial feature data when quality information of an iris area extracted from the current frame image is invalid. When the quality is invalid, iris recognition may be difficult or the accuracy of recognition may be reduced. Thus, the user recognition apparatus extracts the facial feature data of the face to be used for a subsequent frame, instead of performing the iris recognition.

In operation 220, the user recognition apparatus performs an iris recognition based on the iris area when the quality information is valid. When the quality information is valid, an accuracy of iris recognition may be guaranteed, and thus, the user recognition apparatus performs the iris recognition. The iris recognition may be, for example, an operation of identifying an input iris matching a registered iris or verifying whether an input iris matches a registered iris.

Hereinafter, a verification may be an operation of determining input data is true or false, and an identification may be an operation of determining a label indicated by input data among a plurality of labels.

The user recognition apparatus determines that the recognition is successful or additionally performs a fusion recognition based on a result of the iris recognition. The fusion recognition may be a recognition performed based on a plurality of attributes of an object such as, for example, an operation of identifying an object matching a registered user or verifying whether an object matches a registered user based on an iris and iris feature data of a corresponding object represented in an input image.

FIG. 3 illustrates an example of a user recognition. In operation 301, the user recognition apparatus acquires a frame image. A user recognition apparatus consecutively receives a plurality of frame images and acquires a current frame image. The user recognition apparatus acquires an $i^{th}$ frame image in operation 301, and performs a processing on the $i^{th}$ frame image in operations 302, 303, 304, 311, 312, 321, 322, 331, 332, and 333. Also, the user recognition apparatus performs a processing on an $(i+1)^{th}$ image simultaneously while performing the processing on the $i^{th}$ frame image in operations 302, 303, 304, 311, 312, 321, 322, 331, 332, and 333. " " being an integer greater than or equal to 1. The $i^{th}$ frame image is also referred to as the current frame image.

In operation 302, the user recognition apparatus detects an iris area. The user recognition apparatus extracts the iris area from the current frame image.

In operation 303, the user recognition apparatus checks quality information. The user recognition apparatus calculates the quality information based on at least one of, for example, an exposure amount of the iris area or a shake amount of the iris area.

In operation 304, the user recognition apparatus determines whether the quality information of the iris area is valid. Additional description of the determination of whether the quality information is valid will also be described with reference to FIG. 4.

In operation 210, the user recognition apparatus performs facial recognition when the quality information is not sufficiently valid. In operation 311, the user recognition apparatus extracts a facial feature. The user recognition apparatus extracts facial feature data corresponding to at least a portion of the face from the current frame image. In operation 312, the user recognition apparatus stores the facial feature. The user recognition apparatus stores the extracted facial feature data while a number of frames are processed. In an example, the number of frames that are processed is a frame length set for a recognition to be performed. When a corresponding frame length ends, the user recognition apparatus determines the recognition as failed.

The user recognition apparatus compares the facial feature data extracted from the current frame image to registered facial feature data corresponding to a registered user, calculates a facial feature score, and stores the facial feature score. In an example, the facial feature score is also used for a subsequent fusion recognition.

In operation 332, the user recognition apparatus waits for a subsequent frame after the face recognition is performed in operation 210. The user recognition apparatus waits until a subsequent frame image is acquired.

In operation 220, the user recognition apparatus performs an iris recognition when the quality information is valid.

In operation 321, the user recognition apparatus performs an iris recognition. The user recognition apparatus calculates an iris score of the iris area.

In operation 322, the user recognition apparatus determines whether the iris score is greater than or equal to an iris threshold score. In an example, the user recognition apparatus determines that the iris area matches registered iris information when the iris score is greater than or equal to an iris threshold set for a registered iris of the registered user. The registered iris information may be information associated with the registered iris of the registered user and include, for example, iris feature data and an image of the registered iris.

The user recognition apparatus performs the user recognition in operation 331 when the iris score is less than the iris threshold score. In operation 331, the user recognition apparatus determines whether a face extraction result of the previous frame is present and a fusion recognition satisfies a recognition reference. The recognition reference may be set individually for the iris area and the facial feature data or set based on the iris area and the facial feature data. In operation 333, when the iris area matches the registered iris information, the user recognition apparatus recognizes the face as a face of a registered user corresponding to registered iris information. In an example, the registered iris information is information on an iris previously registered in a database included in the user recognition apparatus. In an example, a previous frame includes a frame immediately previous to a current frame and a frame previous to the immediately previous frame. For example, a previous frame of an $i^{th}$ frame may be at least one of a first frame through an $(i-1)^{th}$ frame, i being an integer greater than or equal to 1.

When the iris area does not match the registered iris information, in operation 331, the user recognition apparatus determines whether facial feature data extracted from a previous frame is present. When facial feature data extracted from a previous frame is present, the user recognition apparatus performs the user recognition based on the iris area and the facial feature data extracted from the previous frame. A example of determining whether the fusion recognition satisfies the recognition reference will be described below.

To perform the user recognition, the user recognition apparatus calculates the iris score based on the iris area and calculates the facial feature score based on facial feature data stored for the previous frame. The user recognition apparatus calculates a similarity between an input iris area and the registered iris, for example, using a Euclidean distance as the iris score, and calculates a similarity between input facial feature data and registered facial feature data as the facial feature score. When the iris score is greater than a first threshold score set for the registered iris of the registered user, and when the facial feature score is greater than a second threshold score set for the registered facial feature of the registered user, the user recognition apparatus determines that the object included in the current frame image matches the registered user. In operation 333, in an example, when the iris score and the face feature score exceed individually set thresholds, the user recognition apparatus determines that the recognition is successful.

In an example, the user recognition apparatus calculates the facial feature score using the facial feature data stored for up to the previous frame without a need to extract facial feature data of a face from the current frame image. Thus, the user recognition apparatus improves the efficiency of performing user recognition.

In an example, the user recognition apparatus calculates a combined score based on the iris area and the facial feature data. In an example, the user recognition apparatus applies an iris weight to the iris score based on the iris area and applies a feature weight to the facial feature score based on the facial feature data, thereby calculating the combined score. The user recognition apparatus determines that the object included in the current frame image matches the registered user when the combined score is greater than a combined threshold score. In operation 333, When the combined score obtained by integrally calculating the iris area and the facial feature data is greater than the combined threshold score, the user recognition apparatus determines that the user recognition is successful.

In an example, when facial feature data extracted from the previous frame is absent, in operation 332, the user recognition apparatus waits until a subsequent frame image is acquired. In an example, when the fusion recognition does not satisfy the recognition reference, the user recognition apparatus waits for the subsequent frame image in operation 332.

The iris threshold score may be a threshold set to determine whether the iris recognition is successful. The first threshold score, the second threshold score, and the combined threshold score may be thresholds set to determine whether the fusion recognition is successful. Thus, values of the iris threshold score, the first threshold score, the second threshold score, and the combined threshold score may be set based on a design.

FIG. 4 is a diagram illustrating an example of a procedure of determining whether quality information is valid in operation 304 of FIG. 3.

In operation 410, the user recognition apparatus determines whether quality information is greater than or equal to minimum threshold. When quality information of an iris area extracted from a current frame image is less than a minimum threshold, in 332, the user recognition apparatus waits for a subsequent frame instead of extracting facial feature data and performing an iris recognition.

In operation 420, the user recognition apparatus determines whether the quality information is greater than or equal to a valid threshold. The valid threshold is set as, for example, a value higher than the minimum threshold. When the quality information of an iris area extracted from the current frame image is greater than or equal to the minimum threshold and less than the valid threshold, the user recognition apparatus extracts facial feature data in operation 311.

When the quality information of the iris area is greater than or equal to the valid threshold, the user recognition apparatus performs the iris recognition based on the iris area in operation 220.

The minimum threshold and the valid threshold may be thresholds indicating whether quality information of an iris area is valid and thus, determined based on a design.

Figure 5:
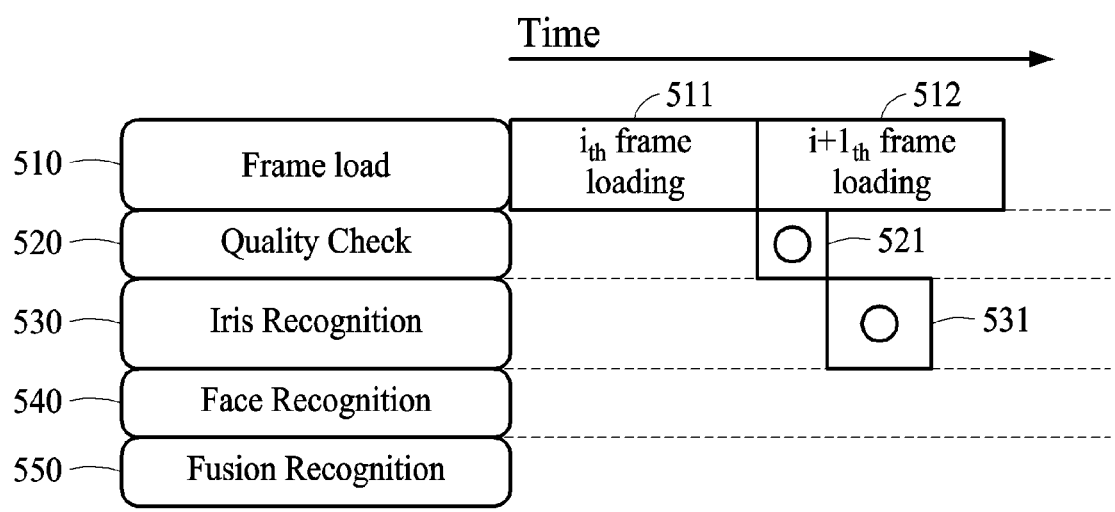
FIGS. 5 through 7 illustrate examples of performing an iris recognition, a face recognition, and a fusion recognition.
Figure 6:
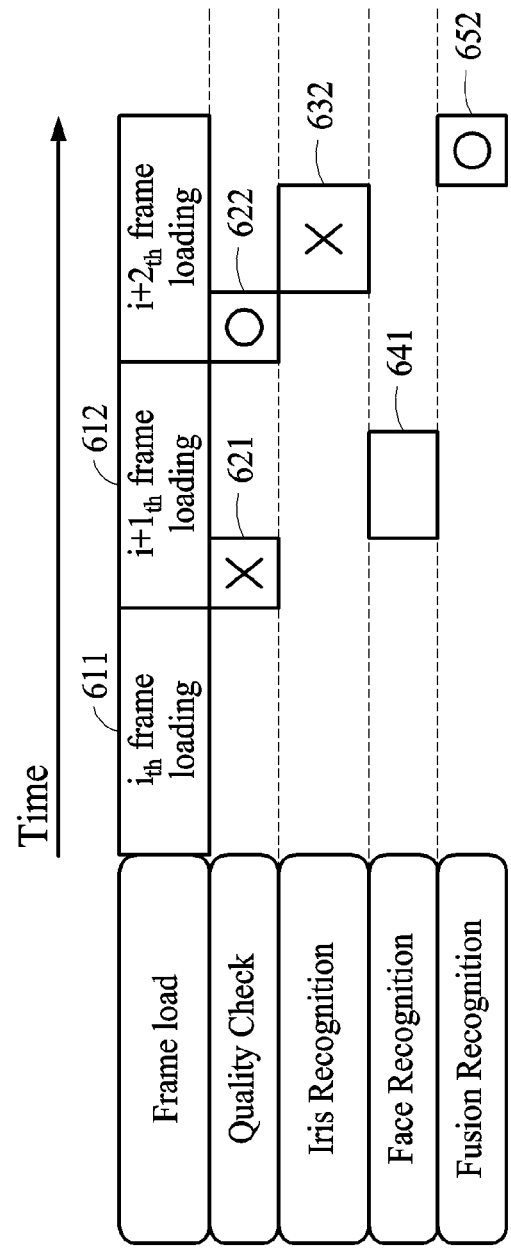
Figure 7:
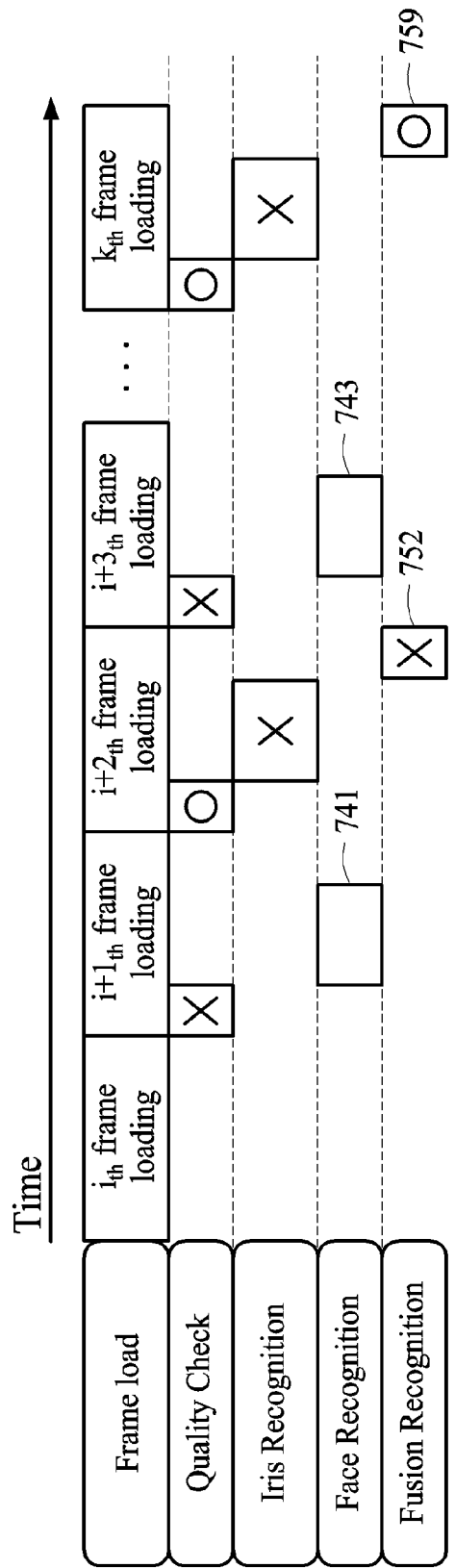

FIGS. 5 through 7 illustrate examples of performing an iris recognition, a face recognition, and a fusion recognition.

Referring to FIG. 5, a user recognition apparatus performs a frame loading 510, a quality check 520, an iris recognition 530, a face recognition 540, and a fusion recognition 550 for each frame.

A user recognition apparatus loads an $i^{th}$ frame image 511, for example, a current frame image. When the loading 511 of the $i^{th}$ frame image is completed, the user recognition apparatus performs a quality information check 520 on an iris area of the $i^{th}$ frame image. When it is determined that the quality information is valid, the user recognition apparatus performs iris recognition 531. When the iris recognition 531 is successful, the user recognition apparatus determines that a user recognition is successful. In an example, the user recognition apparatus loads an $(i+1)^{th}$ frame image 512 while performing the quality information check 521 and the iris recognition 531.

An example in which quality information of an $i^{th}$ frame is invalid is described with reference to FIG. 6. When a loading 611 of an $i^{th}$ frame is completed, the user recognition apparatus performs a determination 621 on quality information of an $i^{th}$ frame image. When it is determined that the quality information of the $i^{th}$ frame image is invalid, the user recognition apparatus performs a face recognition 641. The user recognition apparatus extracts facial feature data corresponding to a facial feature of a face and stores the extracted facial feature data. When a loading 612 of an $(i+1)^{th}$ frame image is completed, and when a result of a determination 622 indicates that quality information of the $(i+1)^{th}$ frame image is valid, the user recognition apparatus performs an iris recognition 632. When the iris recognition 632 fails, the user recognition apparatus performs a fusion recognition 652. As discussed above, in an example, the fusion recognition 652 is a recognition based on the iris recognition 632 performed on the $(i+1)^{th}$ frame image and the facial feature data extracted through the face recognition 641 performed on the $i^{th}$ frame image.

Referring to FIG. 7, a user recognition apparatus performs a user recognition for each frame until a recognition is successful.

The user recognition apparatus performs an extraction 741 of facial feature data of a face in an $i^{th}$ frame image when quality information of the $i^{th}$ frame image is invalid. An iris recognition and a fusion recognition 752 may fail even when quality information of an $(i+1)^{th}$ frame image is valid. Thereafter, when quality information of an $(i+2)^{th}$ frame image is invalid, the user recognition apparatus performs an extraction 743 of facial feature data of a face in the $(i+2)^{th}$ frame image. When an iris area does not match registered iris information, the user recognition apparatus performs a user recognition in operation 759 based on the iris area and cumulative facial feature data up to facial feature data of a frame previous to a current frame.

Figure 8:
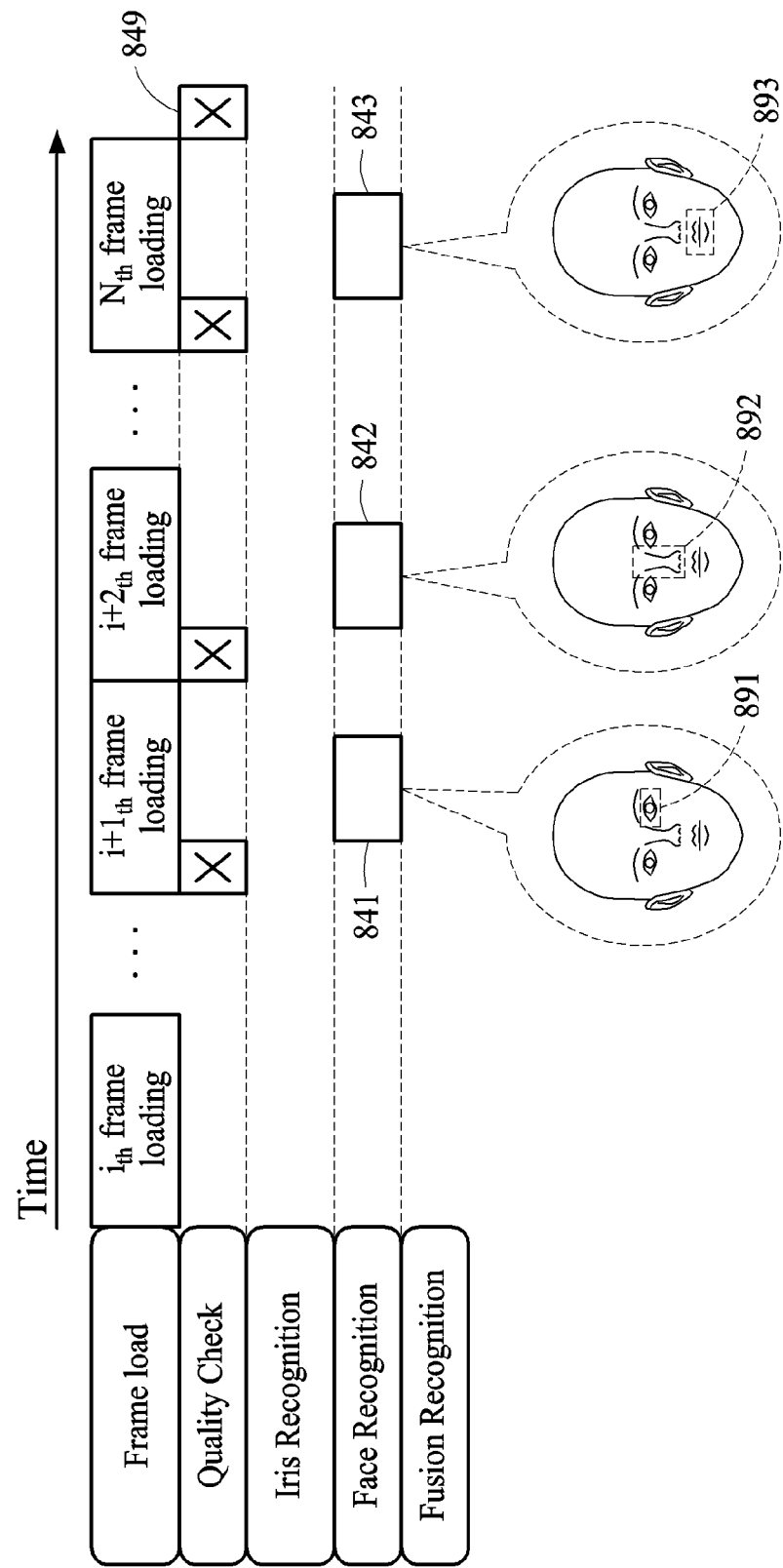
FIG. 8 illustrates an example of selecting a part to be a target of a face recognition.

FIG. 8 illustrates an example of selecting a part to be a target of a face recognition.

When facial feature data is extracted with respect to an overall face or a combination of different parts of a face, a user recognition apparatus accumulates the extracted facial feature data and stores the accumulated facial feature data. Referring to FIG. 8, the user recognition apparatus performs an extraction 841 of facial feature data of an eye part 891 in an $i^{th}$ frame image and stores the facial feature data. The user recognition apparatus performs an extraction 842 of facial feature data of an nose part 892 in an $(i+1)^{th}$ frame image and stores the facial feature data. The user recognition apparatus performs an extraction 843 of facial feature data of a mouth part 893 in an $(i+2)^{th}$ frame image and stores the facial feature data. In an example, the user recognition apparatus extracts facial feature data associated with a combination of parts as well as a single part. For example, the user recognition apparatus extracts facial feature data of parts of an eye and a nose and stores the facial feature data.

As described above, the user recognition apparatus extracts, from a current frame image, facial feature data of a part different from a part of which facial feature data is extracted from a previous frame image. In an example, the user recognition apparatus repetitively uses at least one piece of facial feature data extracted from upto the previous frame to calculate a face feature score or a combined score.

The user recognition apparatus determines a target part for extracting facial feature data from the current frame image based on an extraction order. The user recognition apparatus extracts facial feature data of the determined target part. The extraction order may be an order set for each part of a face and may vary based on a design.

In an example, the user recognition apparatus uses a plurality of landmarks, for example, at least three landmarks. A set of landmarks to be applied to an overall face or portions of the face may be defined. The user recognition apparatus generates facial feature data and a facial image normalized based on the set of landmarks. The user recognition apparatus selects a facial area corresponding to the defined set of landmarks from a plurality of facial areas, and extracts facial feature data of a part corresponding to the selected facial area.

The user recognition apparatus preferentially selects facial feature data having a relatively high quality from facial feature data of the overall face or the portions of the face extracted in the previous frame. The landmark is a part having a feature representing a face, for example, an eye, a nose, a mouth, and an ear.

The user recognition apparatus selects facial feature data of the overall face or portions of the face corresponding to an area having the highest quality information when extracting the facial feature data using a plurality of landmarks in the current frame image. When an area of the overall face or a plurality of areas corresponding to the portions of the face is identified, the user recognition apparatus selects a facial area corresponding to the highest quality information from a plurality of facial areas. The user recognition apparatus calculates quality information of the overall face or the portions of the face from the plurality of landmarks and selects an area having the highest quality information. The user recognition apparatus extracts facial feature data of a part corresponding to the selected facial area.

The user recognition apparatus terminates an operation of the user recognition in response to a frame image determined as an image matching a registered user being absent after a number of frames are processed. The user recognition apparatus performs a validity check 849 on quality information when a loading of an $N^{th}$ frame is completed, N being an integer greater than or equal to 1. When the quality information is invalid, the user recognition apparatus terminates an operation of recognition. Also, even when the quality information associated with an $N^{th}$ frame image is valid, the user recognition apparatus terminates the operation of recognition in response to a failure of the iris recognition.

Figure 9:
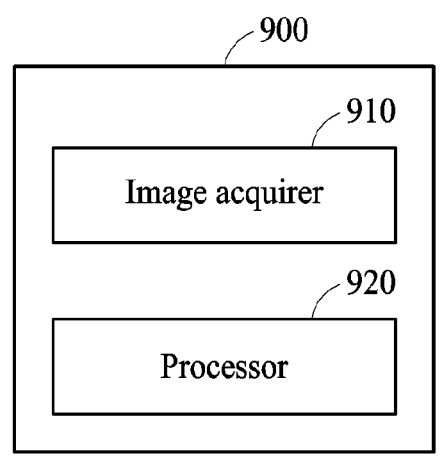
FIG. 9 illustrates an example of a user recognition apparatus.

FIG. 9 illustrates an example of a user recognition apparatus. A user recognition apparatus 900 includes an image acquirer 910 and a processor 920.

The image acquirer 910 acquires a plurality of frame images.

The processor 920 extracts face feature data corresponding to at least a portion of a face from a current frame image in response to quality information of an iris area extracted from the current frame image among the plurality of frame images being invalid, and performs an iris recognition based on the iris area in response to the quality information being valid.

Operations of the image acquirer 910 and the process 920 are not limited to the aforementioned example, and the image acquirer 910 and the process 920 may also perform operations in combination with the operations described with reference to FIGS. 1 through 8. In addition to the description of the image acquirer 910 and the process 920, the descriptions of FIG. 1-8 is also applicable to FIG. 9, and are incorporated herein by reference.

The user recognition apparatus 110, 900, and other apparatuses, units, modules, devices, and other components are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD).

The methods illustrated in FIGS. 2-3 and 4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to recognize a user, the method comprising:
extracting current facial feature data corresponding to a portion of a face from a frame image, in response to quality information of an iris area extracted from the frame image being invalid;
performing an iris recognition based on the iris area, in response to the quality information being valid;
determining availability of prior facial feature data extracted from a prior frame image, in response to the iris area not matching registered iris information; and performing a user recognition based on the iris area and the prior facial feature data, in response to the prior facial feature data being available.

2. The method of claim 1, wherein the performing of the user recognition further comprises:
waiting for a subsequent frame image is to be acquired, in response to the prior facial feature not being available.

3. The method of claim 1, wherein the performing of the user recognition comprises determining that an object included in the current frame image matches a registered user, in response to:
an iris score being greater than a first threshold score set for a registered iris of the registered user, the iris score being calculated based on the iris area, and
a facial feature score being greater than a second threshold score set for a registered facial feature of the registered user, the facial feature score being calculated based on the facial feature data.

4. The method of claim 1, wherein the performing of the user recognition comprises:
determining that an object included in the current frame image matches a registered user in response to a combined score being greater than a combined threshold score, the combined score being calculated based on the iris area and the facial feature data.

5. The method of claim 4, wherein the determining that the object matches the registered user comprises:
calculating the combined score by applying an iris weight to an iris score based on the iris area and applying a feature weight to a facial feature score based on the facial feature data.

6. The method of claim 1, wherein the performing of the iris recognition comprises:
recognizing the face as a face of a registered user corresponding to registered iris information, in response to the iris area matching the registered iris information.

7. The method of claim 1, wherein the performing of the iris recognition comprises:
performing the user recognition based on the iris area and cumulative facial feature data up to facial feature data of a frame previous to the frame image, in response to the iris area not matching the registered iris information.

8. The method of claim 1, wherein the extracting of the current facial feature data comprises:
accumulating facial feature data of different parts, and storing the accumulated facial feature data.

9. The method of claim 1, wherein the extracting of the current facial feature data comprises:
extracting, from the frame image, facial feature data of a part different from a part of which facial feature data is extracted from a previous frame.

10. The method of claim 1, wherein the extracting of the current facial feature data comprises:
determining a target part from the frame image based on an extraction order; and
extracting the facial feature data of the target part.

11. The method of claim 1, wherein the extracting of the current facial feature data comprises:
selecting a facial area corresponding to a landmark set from a plurality of facial areas; and
extracting facial feature data of a part corresponding to the selected facial area.

12. The method of claim 1, wherein the extracting of the current facial feature data comprises:
selecting a facial area corresponding to an area having highest quality information, in response to an overall face area or portions of the overall face area being identified from the frame image; and
extracting facial feature data of a part corresponding to the selected facial area.

13. The method of claim 1, further comprising:
extracting the facial feature data from a subsequent frame and performing the iris recognition, in response to the quality information of the iris area extracted from the frame image being less than a minimum threshold.

14. The method of claim 1, wherein the extracting of the current facial feature data comprises:
extracting the current facial feature data, in response to the quality information of the iris area extracted from the frame image being greater than or equal to a minimum threshold and less than a valid threshold.

15. The method of claim 1, further comprising:
terminating the user recognition in response to a frame image matching a registered user being absent, in response to a number of frames are processed.

16. The method of claim 1, further comprising:
calculating the quality information of the iris area based on any one or any combination of an exposure amount of the iris area and a shake amount of the iris area; and
determining whether the quality information of the iris area is valid.

17. The method of claim 1, further comprising:
projecting an infrared light to an object and acquiring the frame image based on an infrared light reflected from the object.

18. A non-transitory computer-readable medium storing instructions that, when executed by a processor, cause the processor to perform the method of claim 1.

19. An apparatus to recognize a user, the apparatus comprising:
an image acquirer configured to acquire frame images; and
a processor configured to
extract current facial feature data corresponding to a portion of a face from a frame image from among the frame images, in response to quality information of an iris area extracted from the frame image being invalid,
perform an iris recognition based on the iris area, in response to the quality information being valid,
determine availability of prior facial feature data extracted from a prior frame image, in response to the iris area not matching registered iris information; and
perform a user recognition based on the iris area and the prior facial feature data, in response to the prior facial feature data being available.

* * * * *